United States Patent [19]

Ito

[11] Patent Number: 4,758,110
[45] Date of Patent: Jul. 19, 1988

[54] BALL JOINT

[75] Inventor: Eiichi Ito, Meerbusch, Fed. Rep. of Germany

[73] Assignee: TRW Ehrenreich GmbH & Co. KG, Dusseldorf, Fed. Rep. of Germany

[21] Appl. No.: 123,348

[22] Filed: Nov. 20, 1987

[30] Foreign Application Priority Data

Nov. 22, 1986 [DE] Fed. Rep. of Germany ....... 3639962

[51] Int. Cl.$^4$ .............................................. F16C 11/00
[52] U.S. Cl. ..................................... 403/140; 403/122
[58] Field of Search ......................... 403/135, 140, 122

[56] References Cited

U.S. PATENT DOCUMENTS 3,988,558 10/1976 Josemaus et al. ............... 403/122 X
4,568,216 2/1986 Mizusawa et al. .............. 403/122 X
4,601,603 7/1986 Nakayama ...................... 403/122 X

FOREIGN PATENT DOCUMENTS 3239208 5/1983 Fed. Rep. of Germany .
3515303 11/1986 Fed. Rep. of Germany .
2166487 5/1986 United Kingdom .

Primary Examiner—Andrew V. Kundrat
Attorney, Agent, or Firm—Tarolli, Sundheim & Covell

[57] ABSTRACT

A ball joint for use in motor vehicles comprises a bearing member (7) made of a plastic material and disposed between a joint housing (1) made of a plastic material and a ball head (3). The bearing member has projections (10) on its outer surface that engage undercuts (11) on the inner wall of the joint housing. The joint housing (1) is simple to produce. The bearing member (7) is prevented from rotation with the ball head. To this end, the undercuts (11) are formed as circumferentially extending boundary walls of axially extending grooves (13) which open at one end (14) of the joint housing (1). The projections (10) on the outer surface of the bearing member (7) engage the circumferentially extending boundary walls of the grooves (13) and the radially extending side walls thereof.

5 Claims, 2 Drawing Sheets

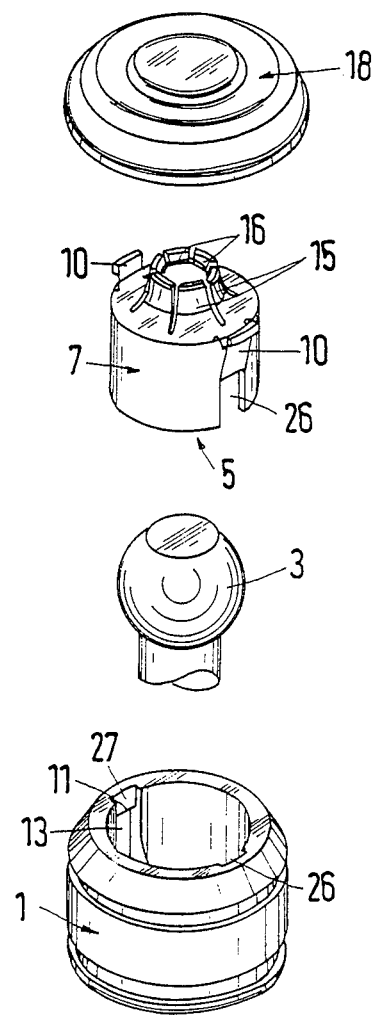

BALL JOINT

The invention relates to a ball joint for use in motor vehicles and comprising a bearing member made of a plastic material and located between a joint housing made of a plastic material and a ball head of a ball stud. The bearing member is secured against being forced out of the joint housing by projections formed on its outer surface and which engage undercuts on the inner wall of the joint housing.

There is a desire to produce ball joint housings from a plastic material. Thereby, production costs and part weight may be reduced. It is also possible to form the joint housing integral with rods made from a glass fiber material. Certain rods in motor vehicles, for example, connection rods for a stabilizer, may be subjected to considerable stresses. Therefore, when the joint housing is made from a plastic material, the ball stud must be effectively secured against being pulled or pushed out of the housing. Moreover, a hermetic and economical sealing of the ball joint is required to protect the interior of the joint housing against penetration of dirt.

German Laid-Open application No. 3,239,208 discloses a ball joint comprising a joint housing made of a plastic material, a bearing member made of a plastic material, and a ring for receiving a ball head. The bearing member is made of a plastic material and has on the outer surface thereof a ring groove for receiving a circumferential projection on the inner wall of the joint housing. This bearing member has also a circumferential flange for engaging and sealing against the upper end surface of the joint housing. A split resilient ring is received in a bore portion of the plastic joint housing tapered toward the opening through which a stud extends. Upon insertion of the ball head of the ball stud into the joint housing, the ring is expanded until it circumscribes the main diameter of the ball head. Then the ring contracts and lies against a tapered surface of the bore. Then the ball head is supported against both the bearing member and the ring and is secured against being pulled out of the joint housing. The preload of the ring prevents against backlash.

In the known ball joint, the ball stud is unable to withstand large axial pulling forces since it can be pulled out of the ring which is made of metal. Moreover, the production of the joint housing is expensive because forming the circumferential projection and the tapered bore therein requires an expensive spray mold or an additional finishing step. The circumferential projection in the joint housing requires application of large forces during assembly of the bearing member half made of a plastic material with the housing which forces can damage the edges of the projection and of the ring groove of the plastic bearing member. This, in turn, may cause, during use, pushing of the ball stud out of the housing. Moreover, in the known construction, there is a possibility of rotation of the plastic bearing member with the ball head. This may cause wear of respective surfaces of the joint housing and the plastic bearing member. The wear increases the danger of the ball stud being pushed out of the housing.

German Pat. No. 3,515,303 discloses a ball joint comprising a ball stud, a ball socket with slits at the open side thereof, a steel ring with an arm for receiving a linkage and a one-piece tensioning unit associated with the ball socket and which tensions the upper zone of the ball socket to provide for force-locking and form-locking stabilization of the ball socket. The tensioning unit for axial tensioning of the ball socket which socket together with the steel ring form the housing of the ball joint, is designed as a toggle mechanism. This toggle mechanism has claws which engage the ball socket and which are connected by arms with a centrally arranged and axially movable pressure member. The pressure member serves as a handle for actuating the toggle mechanism. In this known ball joint, the ball socket is not secured against rotation in the housing.

Finally, British Laid-Open application No. 2,166,487 discloses a ball joint comprising a bearing member which can be snapped into a mounting and is kept therein by a collar surrounding the mounting and flexible claws. In this known ball joint, the bearing member is also not secured against rotation.

The object of the invention is a ball joint comprising a housing which can be produced more simply, and a bearing member which is prevented from rotation with the ball head and is reliably secured against being pushed or pulled out of the joint housing.

According to the invention, axially extending grooves are formed in the inner wall of the joint housing. The grooves are open at the end surface of the joint housing where the shank extends from the joint housing. At their opposite ends, the grooves are closed by end walls formed by undercuts in the inner wall of the housing. The bearing member has projections thereon which engage the end walls of the grooves and the side walls of the grooves.

In a ball joint according to the invention, when the bearing member is pressed into the joint housing, the projections are pressed toward the bearing member and then snap into the grooves. Since the projections engage the end walls of the grooves which extend circumferentially, the bearing member is secured against being pushed out of the housing. The bearing member is held against being pulled out of the housing in a conventional manner, by an inner flange of the joint housing, gripping against its end or, if it has a tapered end, the bearing member is held by a respectively tapered portion of the inner wall of the joint housing. It is also within the scope of the invention to provide the joint housing with two groups of grooves which open at both ends of the joint housing, while respective groups of projections secure the bearing member against being pushed or being pulled out of the housing. Since the projections also engage the boundary walls of the grooves, turning of the bearing member with the ball head is prevented.

The joint housing of a ball joint according to the invention can be simply manufactured by injection molding. To this end, a two-part core stamp is used. One core stamp part forms the inner wall of the grooves and the other core stamp part forms the rest of the inner wall of the joint housing. These core stamp parts are arranged, in injection molding, gripping each other in the injection mold, and are moved, after the injection molding, separately from each other, in opposite axial directions to form the joint housing with undercuts.

In one preferred embodiment of the invention, the projections are resilient bendable tongues formed on the bearing member and extending at an acute angle to the circumferentially extending end or boundary walls of te grooves. The tongues, when the bearing member is inserted into the housing, are bent toward the bearing member by the inner wall of the joint housing and on reaching the grooves, snap into the latter. The tongues do not undergo any damage during assembly. They are able to transmit large axial forces since they are subjected practically only to compression stresses. If the tongues have edge beads that engage the boundary circumferential walls as well as radial and bottom surfaces of the grooves, the forces are favorably distributed in the tongue or the joint housing and no local plastic deformations occur.

In a further embodiment, the joint housing is made of a glass-fiber material and is able to withstand considerable force. Preferably, the bearing member is made of a hard resilient plastic material such as polyoxymethylene (POM). The housing cover, on the other hand, may be made of a soft resilient plastic material such as polyurethane, since it performs mainly a sealing and not a bearing function.

Other details and advantages of the invention will appear from the description which follows with reference to respective drawings in which a preferred embodiment of a ball joint according to the invention is shown. In the drawings:

FIG. 2 shows an exploded view of the ball joint of FIG. 1.

Figure 1:
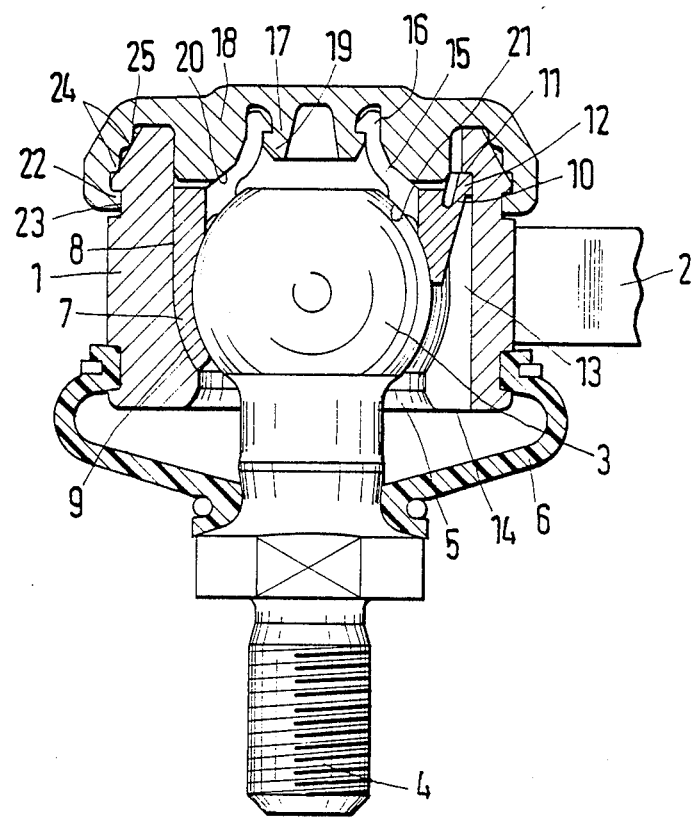
FIG. 1 illustrates a longitudinal cross section of a ball joint with the sectional plane displaced by 90° on the sides of the stud axis.

FIG. 1 shows a ball joint with a joint housing 1 made of a plastic material and comprising a connecting rod 2 formed integrally therewith. A ball head 3 is placed into the joint housing and a shank 4 projects from an opening in the joint housing 1. The gap between joint housing 1 and the shank 4 is closed by a rubber resilient sealing bellows 6 the beads of which are fastened by suitable clamping means against the joint housing 1 and/or the shank 4.

The ball head 3 is held in a bearing member 7 made of a plastic material and having an approximately cylindrical outer surface which upon assembly of the ball joint is bent by the inner wall of the joint housing 1 so that it tapers to the opening 5 toward the axis of the shank. Thereby, the bearing member 7 is resiliently preloaded against the ball head 3, and the ball head 3 and bearing member 7 are secured against being axially pulled out of the joint housing 1.

The bearing member 7 is prevented from being pushed axially out of the housing by projections 10 formed on the end of the bearing member 7 which is opposite the bent portion thereof. The projection engage undercuts 11 of the joint housing 1. The projections 10 have the form of tongues and are provided at their free ends with edge beads 12.

The undercuts 11 form boundary surfaces of axially extending grooves 13 formed in the inner wall 9 and which open at the end 14 of the joint housing where the shank extends from the joint housing. The undercuts 11 extend circumferentially of the inner wall 9. To deform the joint housing after injection molding, a core stamp part is pulled out of the groove 13 at the end 14, and another core stamp part, forming the rest of the inner wall 9 of the joint housing 1, is pulled out at the opposite end of the joint housing 1. In this manner, both the grooves 13 with the undercuts 11 and the inner wall 9 of the joint housing 1 tapering toward the opening 5 are formed.

The projections 10, designed as tongues, extend at an acute angle to the boundary circumferentially extending surfaces of the grooves 13. This insures good bending properties of the projections 10 and a good distribution of force. In the embodiment shown, two undercuts 11 are spaced by 180°, and two corresponding projections 10 are provided.

The bearing member has at its end which is opposite to that where the shank 4 extends, spring elements 15 that engage the ball head and have at their free ends hooks 16 engaging a pressure-knob-like portion 17 of a housing cover 18. The portion 17 has catch beads 19 that grip under the hooks. Outer sides of the spring elements 15 engage an inner surface 20 of the housing cover 18. Thereby, they are biased against the ball head 3. To provide for a definite contact pressure, the spring elements 15 are provided in their lower quarter portion with cams 21 which engage the ball head 3.

The housing cover 18 has an inner flange 22 received in a ring groove extending around the outer surface of the joint housing for fixing the cover. Adjacent the flange 22, the housing cover 18 has on its inner surface sealing beads 24 which engage a conically inclined sealing surface 25 of the joint housing 1.

Assembling of a ball joint according to the invention can best be explained with reference to FIG. 2. First, the ball head 3 is pushed into the opening 5 of the bearing member 7, while openings 26 of the bearing member 7 adjacent the projections 10 provides for resilient deflection and engagement with the ball head 3. Then the pre-assembled unit of the ball head 3 and the bearing member 7 is pushed through an opening in a cover side of the joint housing, and the two tongue-like projections 10 are inserted into the grooves 13. As shown in the drawing, additional inlet grooves 27 may be formed at the cover end of the joint housing 1, and undercuts 11 are formed in the transition zone of the grooves 13 and the inlet grooves 27. The projections resiliently snap beneath the undercuts.

Finally, the housing cover 18 is put on and is caught by the hooks of the spring elements 15. The flange 22 of the cover snaps behind the rim of the joint housing 1.

I claim:

1. Ball joint for use in motor vehicles and comprising a bearing member (7) made of a plastic material and disposed between a joint housing (1) made of a plastic material and a ball head (3) of a ball stud, the bearing member (7) having on the outer surface (8) thereof projections (10) that engage undercuts (11) formed in the inner wall (9) of the joint housing (1) to secure the bearing member against being forced out of the joint housing (1), characterized in that the undercuts (11) form end walls of grooves (13) formed in the inner wall (9) of the joint housing (1) and extending coaxially with the axis of the ball stud, the grooves having one of their opposite ends open at the end surface (14) of the joint housing (1) from which the shank (4) extends and the other of the opposite ends of the grooves closed by the end walls, and that the projections (10) of the bearing member (7) engage not only the end walls but also side walls of respective grooves (13).

2. A ball joint according to claim 1, characterized in that the projections (10) formed on the bearing member (7) are flexible resilient tongues extending at an acute angle to the end walls of the grooves (13).

3. A ball joint according to claim 2, characterized in that the tongues have edge beads (12) that engage the end walls, the side walls and the bottom surfaces of the grooves (13).

4. A ball joint according to one of claims 1 to 3, characterized in that the joint housing (1) is made of a glass-fiber material.

5. A ball joint according to one of claims 1 to 3, characterized in that the bearing member (7) is made of a hard resilient plastic material, for example, polyoxymethylene (POM).

* * * * *